US012766874B2

(12) United States Patent
Corey

(10) Patent No.: US 12,766,874 B2
(45) Date of Patent: Oct. 20, 2026

(54) EXPANSION FILE FOLDER HAVING AT LEAST ONE OF A REMOVABLY SECURED COVER OR A REMOVABLY SECURED IDENTIFICATION INSERT

(71) Applicant: Thomas J. Corey, Snyder, NY (US)

(72) Inventor: Thomas J. Corey, Snyder, NY (US)

( * ) Notice: Subject to any disclaimer, the term of this patent is extended or adjusted under 35 U.S.C. 154(b) by 115 days.

(21) Appl. No.: 18/983,565

(22) Filed: Dec. 17, 2024

(65) Prior Publication Data

US 2026/0166910 A1 Jun. 18, 2026

(51) Int. Cl.
*B42F 13/02* (2006.01)
*B42F 21/06* (2006.01)

(52) U.S. Cl.
CPC .............. *B42F 13/02* (2013.01); *B42F 21/06* (2013.01)

(58) Field of Classification Search
CPC .. B42F 13/02; B42F 21/06; B42F 7/08; B42F 7/02; B42F 7/04; B65D 27/00; B65D 31/10; B65D 5/005
USPC .............. 229/67.1, 67.3, 67.4, 72, 928, 929; 206/425, 818; 281/31, 35, 48; 402/70
See application file for complete search history.

(56) References Cited

U.S. PATENT DOCUMENTS 930,837 A 8/1909 Bushnell, Jr.
1,455,419 A * 5/1923 Eugene .................. B65D 31/10 229/72
5,678,754 A 10/1997 Kranz
7,147,142 B1 * 12/2006 Chang ................ A45C 13/1038 229/67.3
D554,704 S 11/2007 Krepak
7,407,469 B2 8/2008 Lockhart
7,900,814 B2 * 3/2011 McBride ................... B42F 7/02 229/72
7,909,234 B2 3/2011 Maistrellis
8,118,165 B2 2/2012 Duvekot et al.
D739,460 S 9/2015 Gilbertson et al.
9,346,588 B2 5/2016 Gilbertson et al.
9,902,189 B2 2/2018 Gilbertson et al.
11,712,918 B2 8/2023 Corey
2008/0078818 A1 4/2008 Botkin
2009/0166400 A1 7/2009 Lee
2012/0111930 A1 * 5/2012 Maistrellis .............. B42F 21/06 283/37
2022/0355611 A1 11/2022 Corey

FOREIGN PATENT DOCUMENTS

DE 202010001605 U1 4/2010
FR 2329226 5/1977
JP 8032497 3/1997

* cited by examiner

*Primary Examiner* — Christopher R Demeree
(74) *Attorney, Agent, or Firm* — Simpson & Simpson, PLLC

(57) ABSTRACT

An expansion file folder, having a first wall and a second wall, each having four sides, the second wall having a pair of horizontal slots and a pair of vertical slots therein, a U-shaped pleated gusset, the gusset fixedly secured to three of the four sides of the first wall and fixedly secured to three of the four sides of the second wall, thereby forming an open pocket between the first and the second walls, the pocket having a pleated floor, and at least one of a cover having a pair of tabs extending therefrom, the pair of tabs of the cover arranged to removably engage the pair of horizontal slots, and an identification insert having a pair of tabs extending therefrom, the pair of tabs of the identification insert arranged to removably engage the pair of vertical slots.

11 Claims, 13 Drawing Sheets

EXPANSION FILE FOLDER HAVING AT LEAST ONE OF A REMOVABLY SECURED COVER OR A REMOVABLY SECURED IDENTIFICATION INSERT

FIELD OF THE INVENTION

The present invention relates generally to an expansion file folder, and, more particularly, to an expansion file folder having at least one of a removably secured cover or a removably secured identification insert.

BACKGROUND OF THE INVENTION

Expansion file folders are well known in the art. Generally, expansion file folders have a pleated, accordion-like U-shaped expanding gusset that expands as paper or documents are added to the folder. The first gussets were constructed from an adhesive coated cloth which was used as a tape to hold a form and to pleat an accordion-folded gusset. Additionally, expansion file folders generally comprise a non-removable cover to protect the contents within the folder pocket, as well as non-removable tabs or outwardly facing surface areas used to write labels with identifying information upon. Expansion file folders have long been a preferred method of storing, transporting, and organizing documents.

When storing, transporting, or organizing a plurality of documents using expansion file folders, it is important to have a decipherable identification system. Expansion file folders typically accomplish this by using a label written directly on the expansion file folder, either on an outwardly facing surface of the expansion file folder, or on tabs that are protruding from the body of the expansion file folder. This type of labelling is permanent and cannot be altered or removed. Another feature of expansion file folders is the ability to cover the contents within the pocket of the folder when the folder is not in use, or when the folder is being stored. Typically, this is accomplished by a non-removable cover attached to the body of the expansion file folder. Over-use of the non-removable cover, from repeated opening and closing, or from forcing the cover to remain in an open position by bending the cover backwards, can cause the file folder to crease and tear at the junction where the cover is attached to the expansion file folder body. Various attempts to solve these problems have been contemplated and employed.

For example, U.S. Patent Application Publication No. 2008/0078818 discloses an expandable file box that includes an outwardly extending, generally flat cover flap. The cover flap includes a plurality of folding lines extending generally parallel to the upper portion of the main panel which enables the cover flap to fold in a generally forward position. The cover flap can be folded along the folding lines and disposed over the top opening of the expandable file folder and a portion of the front main panel of the front assembly.

Another example is shown in U.S. Pat. No. 7,407,469, which discloses an expandable file folder formed of a single sheet of material and includes two label sections to allow the expandable file folder to be labelled with identifying information. The use of fold lines within the flap allows for a label section between the fold lines, which can be marked with identifying information pertaining to the contents of the expandable file folder. The label section between the folds is readily visible when the expandable folder is on a shelf or in a drawer. Further, the exposed surface of the back of the folder can also be imprinted with a personalized label adhered by adhesive to show names, contents, years, etc.

Thus, there is a long felt need for an expansion file folder having a removably secured cover to decrease wear and tear due to repeated opening, closing or folding. A removably secured cover would increase the lifespan of the expansion file folder while also allowing for easier storage. Further, a removably secured identification insert allows a single folder to be reused with different labels as they are needed, also increasing the lifespan of the folder by not permanently marking the expansion file folder with labels that may become obsolete.

SUMMARY OF THE INVENTION

The present invention broadly comprises an expansion file folder, having a first wall and a second wall, each having four sides, the second wall having a pair of horizontal slots and a pair of vertical slots therein, a U-shaped pleated gusset, the gusset fixedly secured to three of the four sides of the first wall and fixedly secured to three of the four sides of the second wall, thereby forming an open pocket between the first and the second walls, the pocket having a pleated floor, and at least one of a cover having a pair of tabs extending therefrom, the pair of tabs of the cover arranged to removably engage the pair of horizontal slots, and an identification insert having a pair of tabs extending therefrom, the pair of tabs of the identification insert arranged to removably engage the pair of vertical slots.

The present invention also broadly comprises an expansion file folder, having a first wall and a second wall, each having four sides, the second wall having a pair of horizontal slots and a pair of vertical slots therein, a U-shaped pleated gusset, the gusset fixedly secured to three of the four sides of the first wall and fixedly secured to three of the four sides of the second wall, thereby forming an open pocket between the first and the second walls, the pocket having a pleated floor, and at least one of a cover having a pair of tabs extending therefrom, the pair of tabs of the cover arranged to removably engage the pair of horizontal slots, wherein the cover includes at least one magnet arranged therein and at least one of the first and the second walls having at least one of a magnet arranged thereon or therein, and a ferromagnetic piece thereon or therein, wherein the magnet of the cover is arranged to magnetically engage one of the magnets of at least one of the first and the second walls, and the ferromagnetic piece of at least one of the first and the second walls, and an identification insert having a pair of tabs extending therefrom, the pair of tabs of the identification insert arranged to removably engage the pair of vertical slots.

A general object of the invention is to provide an expansion file folder having a removably secured cover to decrease wear and tear due to repeated opening, closing or folding of the cover.

Another general object of the invention is to provide an expansion file folder having a removably secured identification insert that allows a single folder to be reused with different identification inserts as they are needed, increasing the lifespan of the folder.

A further object of the invention is to provide an expansion file folder having a U-shaped pleated gusset comprised of polypropylene.

Another object of the invention is to provide an expansion file folder where the first wall, the second wall, the cover, and the identification insert are comprised of at least one of a plastic or polymer-like material, and a paperboard material.

A further object of the invention is to provide an expansion file folder where the identification insert incudes a vertical transverse strip of removable pressure sensitive adhesive.

These and other objects, features and advantages of the invention will become readily apparent to one having ordinary skill in the art upon study of the following detailed description in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION OF THE PREFERRED EMBODIMENT

At the outset, it should be appreciated that like reference numbers on different drawing figures represent identical structural elements. It should also be appreciated that, while a number of different embodiments and variations of the present invention are shown in the various drawings, the invention as claimed is not intended to be limited to these specific embodiments, as the claims define a broader invention that can take many different shapes and structures.

Figure 1:
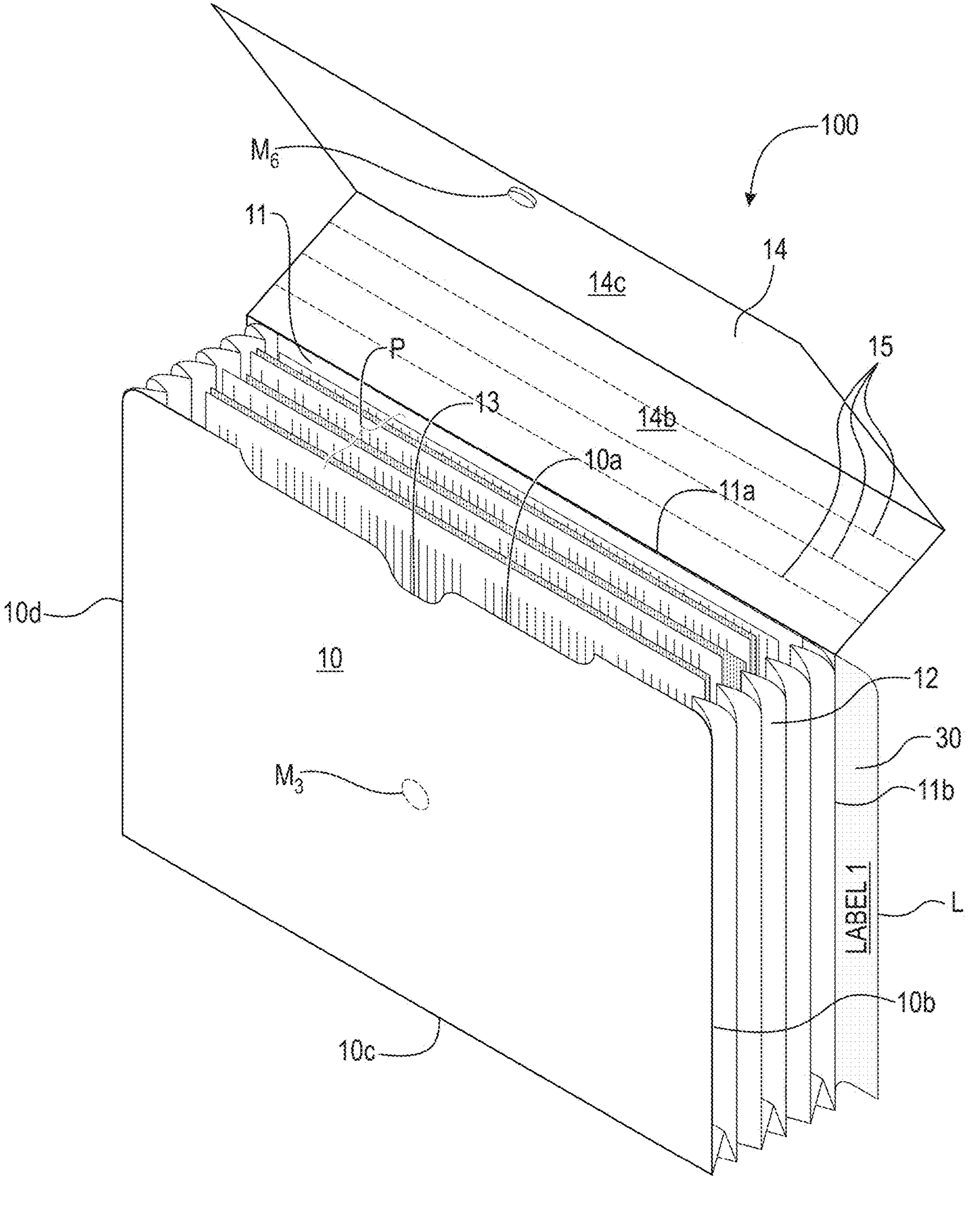
FIG. 1 illustrates a front perspective view of the fully assembled present invention in use with the cover open to expose the contents of the folder, and also showing an identification insert bearing a file label.

Adverting now to the drawings, FIG. 1 illustrates a front perspective view of an expansion file folder 100 in use, containing a plurality of documents P. Expansion file folder 100 comprises a first wall 10, a second wall 11, a U-shaped pleated gusset 12, a removable cover 14, and an identification insert 30. In the exemplary embodiment in FIG. 1, identification insert 30 contains printed indicia L. In the drawing, printed indicia L is the identifier "LABEL 1" but, of course, the indicia could be any identifier, such as a client name, customer name, patient name, docket number, file number, date, etc. Notably, expansion file folder 100 has a removably secured cover 14 and a removably secured identification insert 30, discussed in further detail infra.

Figure 2:
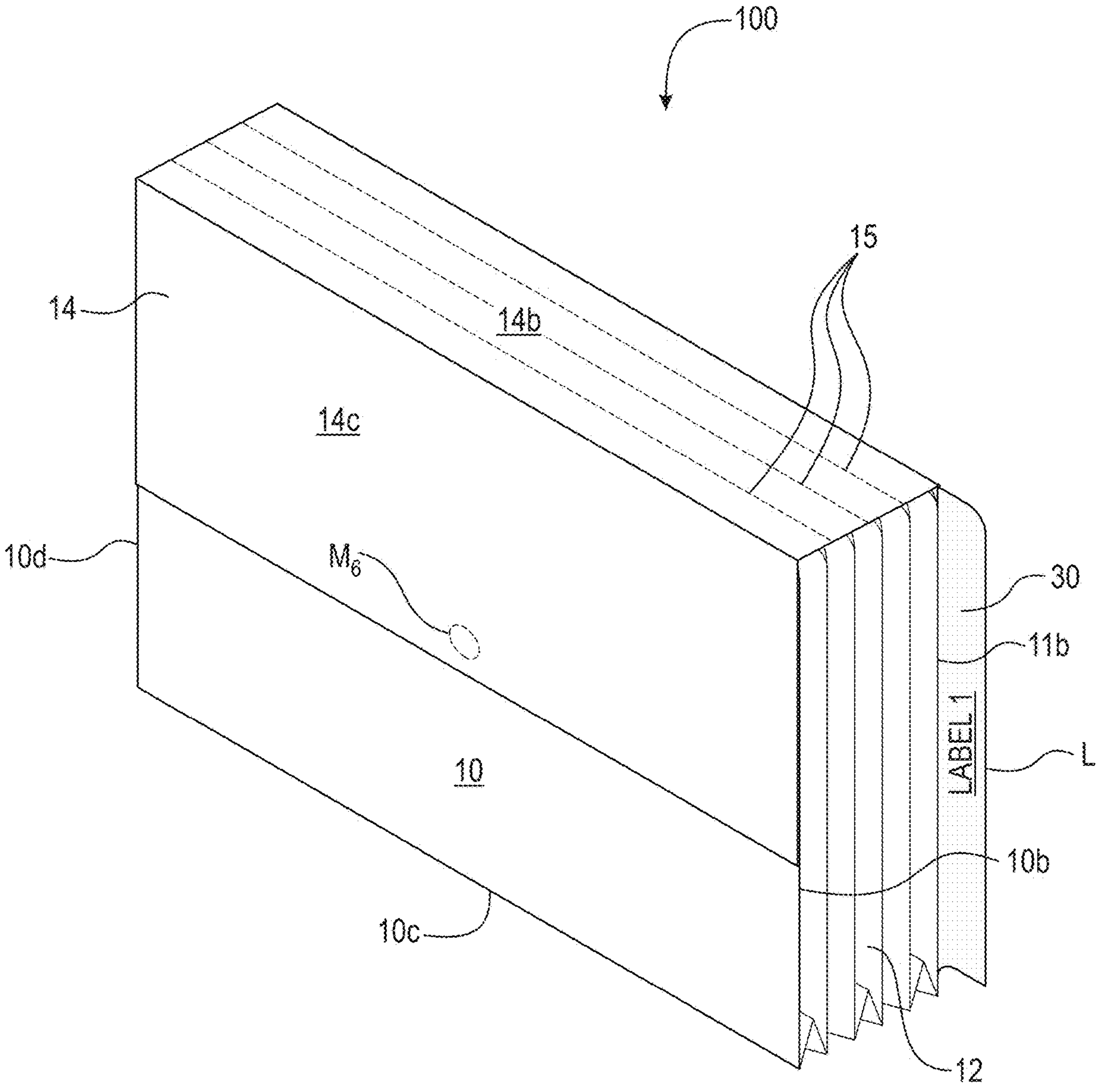
FIG. 2 illustrates a front perspective view of the present invention shown in FIG. 1 where the cover is closed.

FIG. 2 illustrates a front perspective view of expansion file folder 100 in a closed position. Expansion file folder 100 comprises removably secured cover 14 in a closed position and removably secured identification insert 30 attached. Cover 14 has three (3) sections, a back section 14*a* (shown in FIG. 13), a middle section 14*b*, and a front section 14*c*. The inside of front section 14*c* of cover 14 includes at least one magnet $M_6$ arranged therein or thereon, magnet $M_6$ is further arranged to magnetically engage a magnet $M_3$ (shown in FIG. 3) positioned on the inside of first wall 10, removably securing cover 14 to first wall 10. It should be appreciated that one of magnet $M_3$ (shown in FIG. 3) and magnet $M_6$ may comprise a ferromagnetic piece in lieu of a magnet. In other words, one of $M_3$ and $M_6$ could be a magnet while the other is a ferromagnetic piece. It should be further appreciated that there may be other ways in which cover 14 engages first wall 10 to be in a closed position, such as hook and loop fasteners or elastic cord closures.

Figure 3:
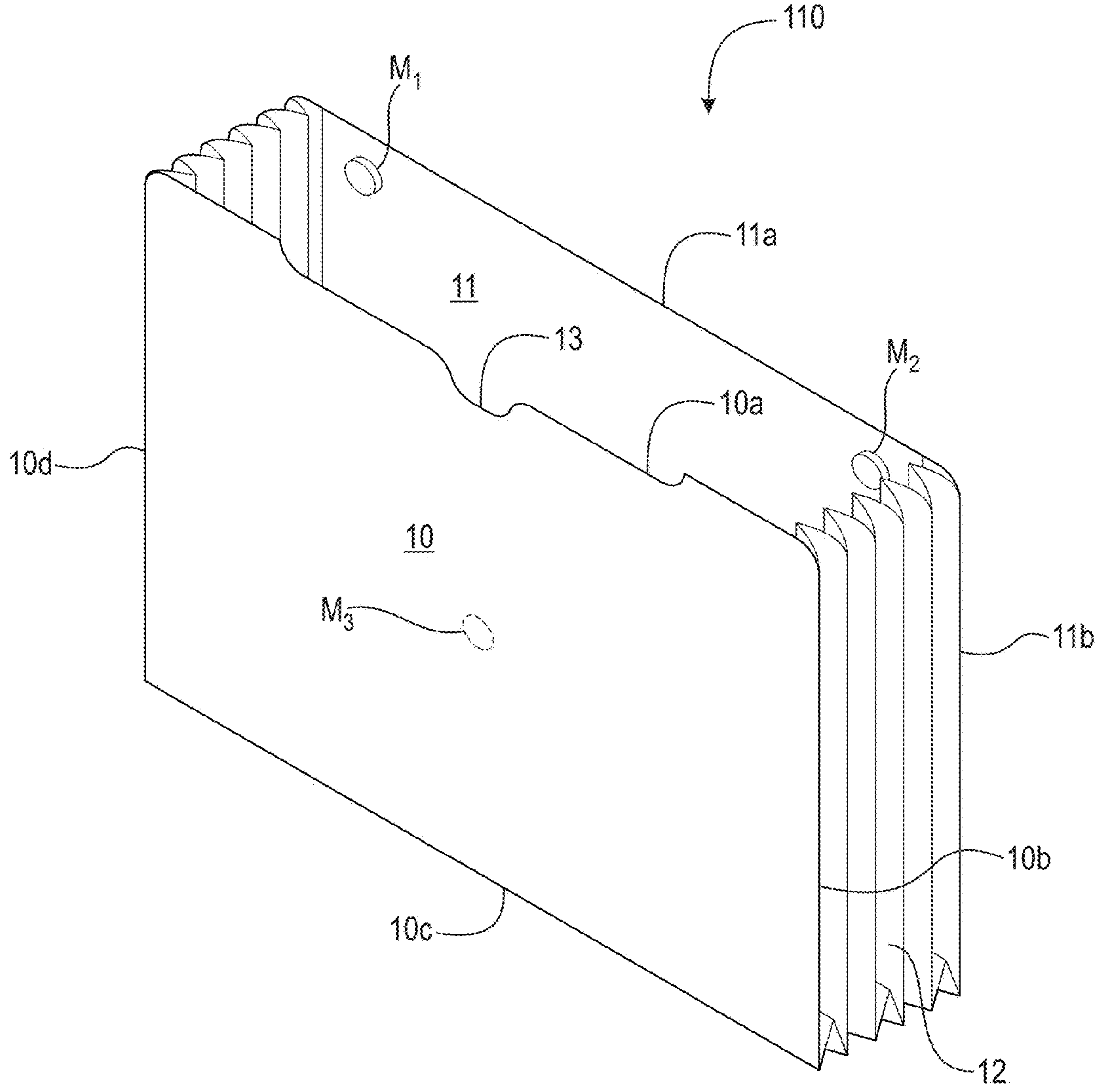
FIG. 3 illustrates a front perspective view of the present invention shown in FIG. 1 where the cover and identification insert are removed.

FIG. 3 illustrates a front perspective view of expansion file folder 110, where cover 14 and identification insert 30 are removed. Expansion file folder 110 comprises first wall 10 having a first, second, third, and fourth side 10*a*, 10*b*, 10*c*, and 10*d*, respectively. Magnet $M_3$ is affixed to or embedded in the inside surface of first wall 10. First side 10*a* has an access notch 13, allowing a person to easily grip expansion file folder 110 to open or adjust the size of the pocket. Second side 10*b* and fourth side 10*d* of first wall 10 are parallel and spaced apart from one another.

Figure 4:
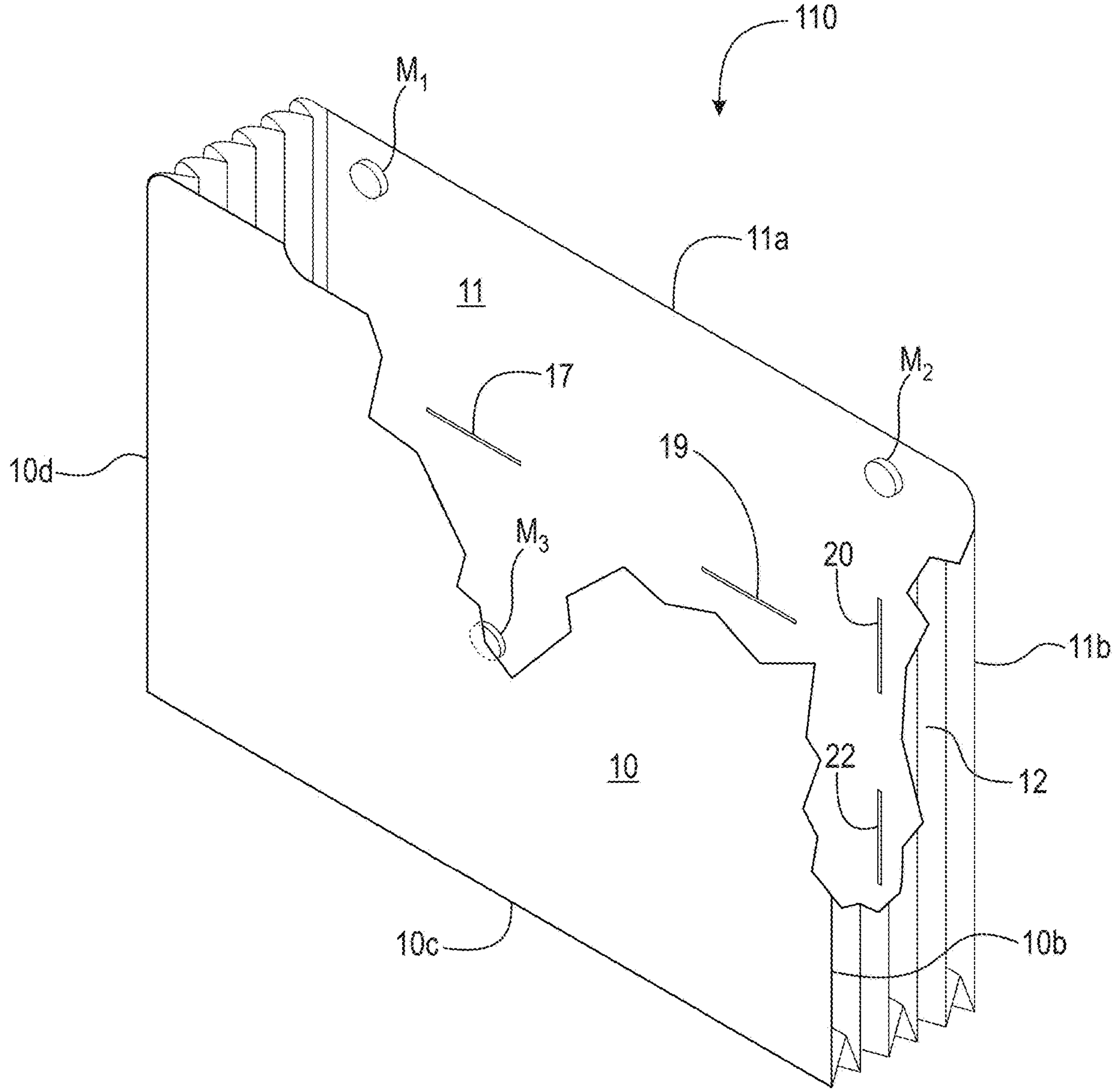
FIG. 4 illustrates a front perspective view of the present invention shown in FIG. 3 where first wall 10 is partially cut-away to reveal the horizontal and vertical slots (17, 19 and 20, 22, respectively) in second wall 11.

FIG. 4 illustrates a front perspective view of expansion file folder 110 shown in FIG. 3 where first wall 10 is partially cut-away to reveal second wall 11 having horizontal slots 17, 19 and vertical slots 20, 22 therein. Further, magnet $M_3$ is partially revealed on the inside surface of first wall 10. In the exemplary embodiment in FIG. 4, the inside of second wall 11 has two (2) magnets $M_1$, $M_2$ affixed to or embedded in the wall and arranged to magnetically engage magnets $M_4$, $M_5$ (shown in FIG. 13), respectively, on cover 14. It should be appreciated that the number of magnets arranged on second wall 11 and cover 14 can be one (1) or more, and that a pair of magnets arranged to attract one another could be replaced by one magnet and one ferromagnetic member.

Figure 5:
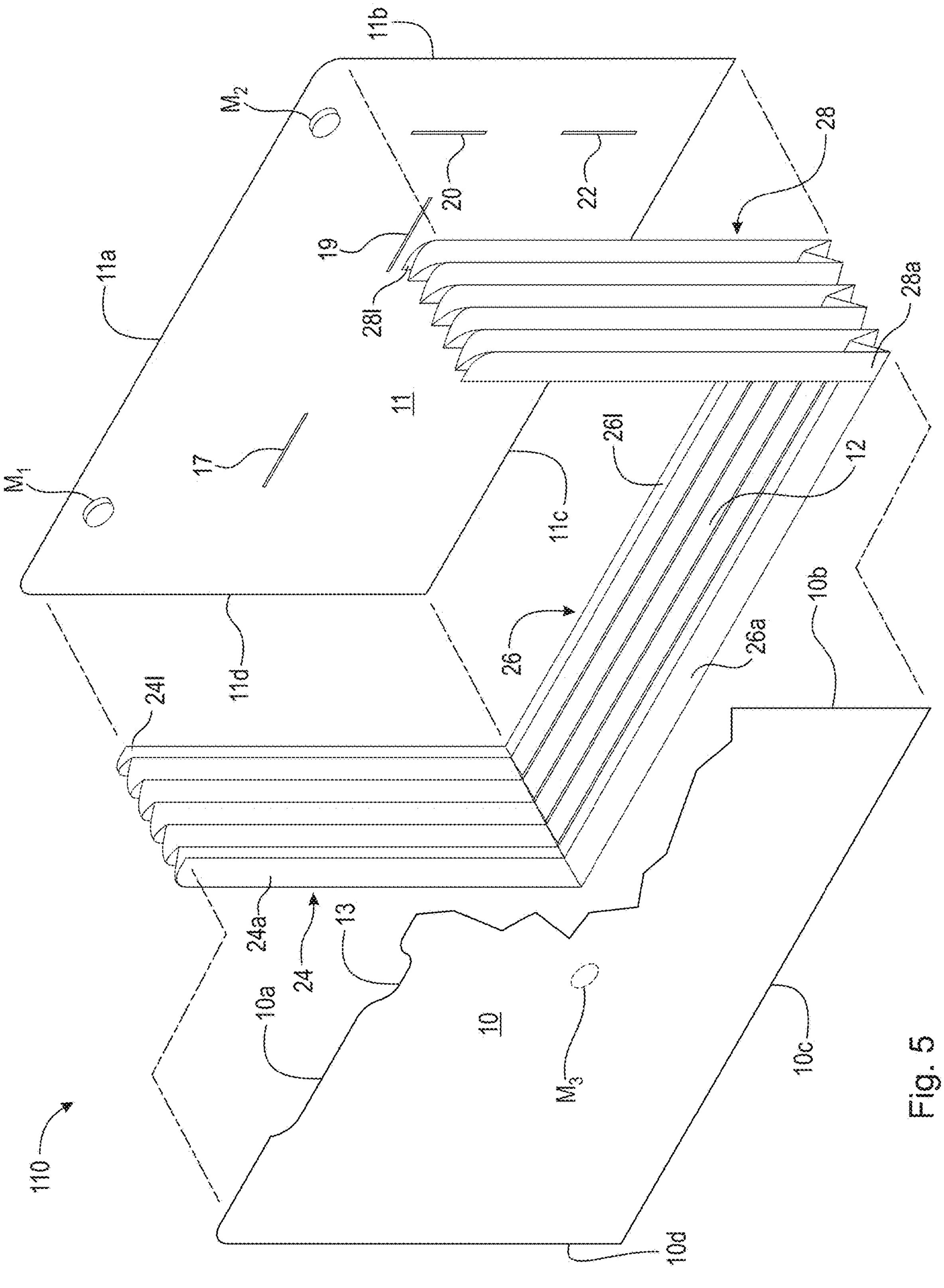
FIG. 5 illustrates a partially exploded view of the present invention shown in FIG. 4.

FIG. 5 illustrates a partially exploded view of expansion file folder 110 shown in FIG. 4. Expansion file folder 110 comprises first wall 10 and second wall 11. Second wall 11 has a first, second, third, and fourth side 11*a*, 11*b*, 11*c*, and 11*d*, respectively. First side 11*a* and third side 11*c* of second wall 11 are parallel and spaced apart from one another, and second side 11*b* and fourth side 11*d* of second wall 11 are parallel and spaced apart from one another. In a preferred embodiment, first wall 10 and second wall 11 are comprised of at least one of a plastic or polymer-like material, or a paperboard material. Expansion file folder 110 further comprises U-shaped pleated gusset 12 having left vertical pleats 24, bottom horizontal pleats 26, and right vertical pleats 28. In a preferred embodiment, U-shaped pleated gusset 12 is comprised of polypropylene. In a preferred embodiment, U-shaped pleated gusset 12 is fixedly secured to three sides 10*b*, 10*c*, 10*d* of first wall 10 and fixedly secured to three sides 11*b*, 11*c*, 11*d* of second wall 11, thereby forming an open pocket between first wall 10 and second wall 11. Second side 10*b* of first wall 10 is fixedly secured to a first right vertical pleat 28*a*. Third side 10*c* of first wall 10 is fixedly secured to a first bottom horizontal pleat 26*a*. Fourth side 10*d* of first wall 10 is fixedly secured to a first left vertical pleat 24*a*. Second side 11*b* of second wall 11 is fixedly secured to a twelfth right vertical pleat 28*l*. Third side 11*c* of second wall 11 is fixedly secured to a twelfth bottom horizontal pleat 26*l*. Fourth side 11*d* of second wall 11 is fixedly secured to a twelfth left vertical pleat 24*l*.

Figure 6A:
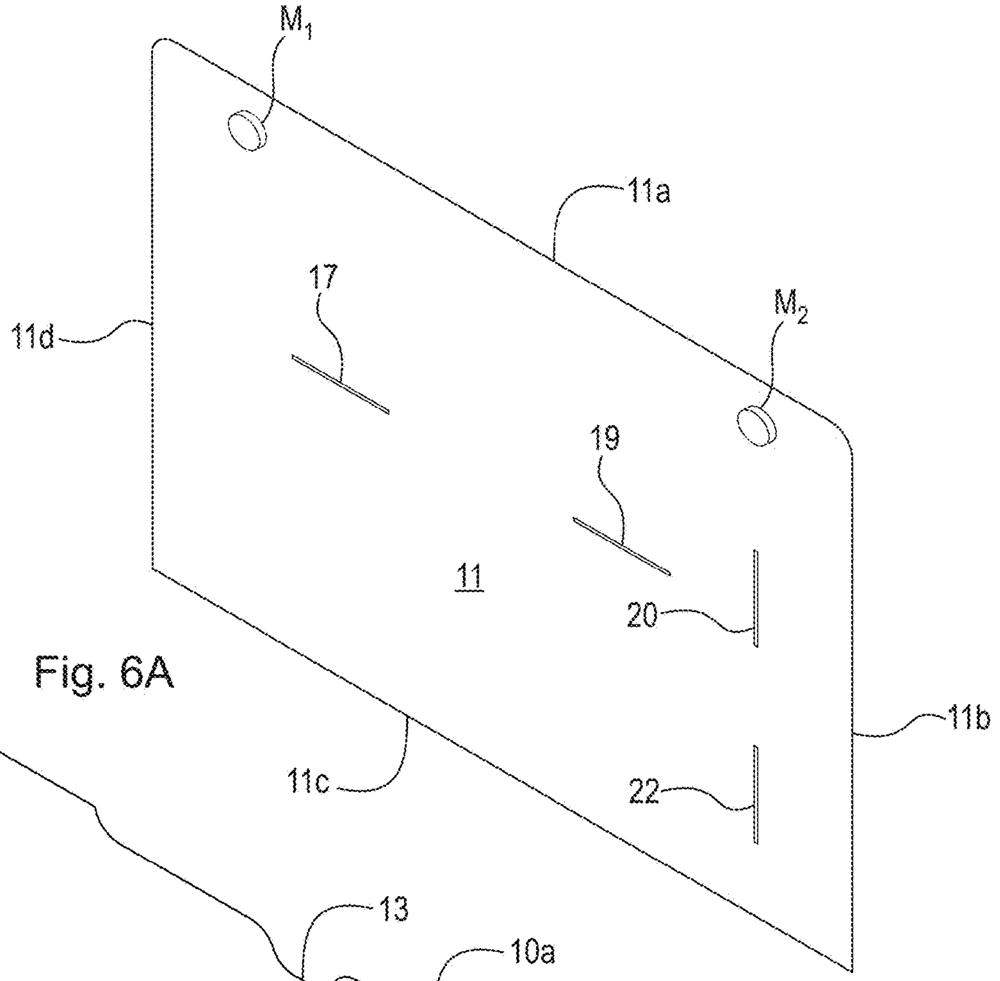
FIG. 6A illustrates a front perspective view of the inside of the second wall.

FIG. 6A illustrates a front perspective view of the inside of second wall 11. Second wall 11 has a first, second, third, and fourth side 11*a*, 11*b*, 11*c*, and 11*d*, respectively, horizontal slots 17, 19, vertical slots 20, 22, and magnets $M_1$, $M_2$ arranged on an inside of second wall 11 or embedded therein. First side 11*a* and third side 11*c* of second wall 11 are parallel and spaced apart from one another, and second side 11*b* and fourth side 11*d* of second wall 11 are parallel and spaced apart from one another.

Figure 6B:
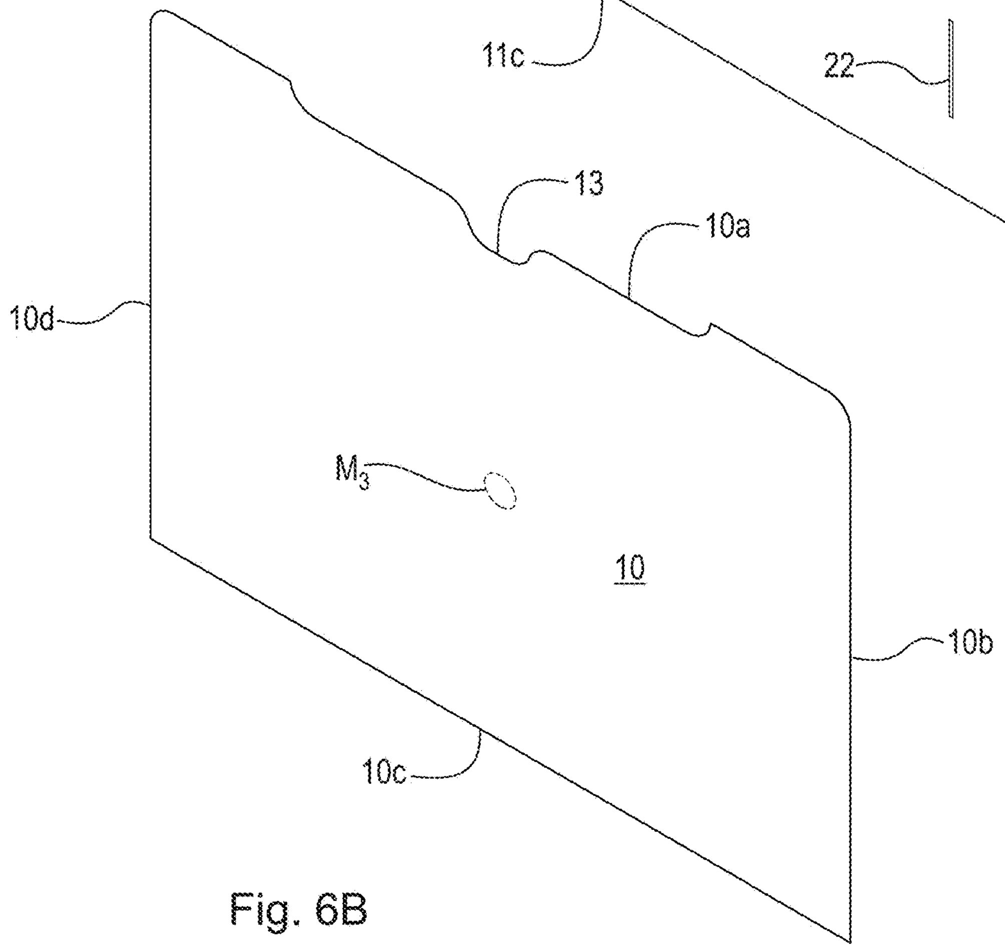
FIG. 6B illustrates a front perspective view of the outside of the first wall.

FIG. 6B illustrates a front perspective view of the outside of first wall 10. First wall 10 has a first, second, third, and fourth side 10*a*, 10*b*, 10*c*, and 10*d*, respectively. Magnet $M_3$ is arranged on the inside surface of first wall 10 or embedded therein, further arranged to magnetically engage magnet $M_6$ (shown in FIG. 1). First side 10*a* has access notch 13, allowing a person to easily grip expansion file folder 110 to open or adjust the size of the pocket. It should be appreciated that the depth and shape of access notch 13 can vary. Second side 10*b* of first wall 10 and fourth side 10*d* of first wall 10 are parallel and spaced apart from one another.

Figure 7:
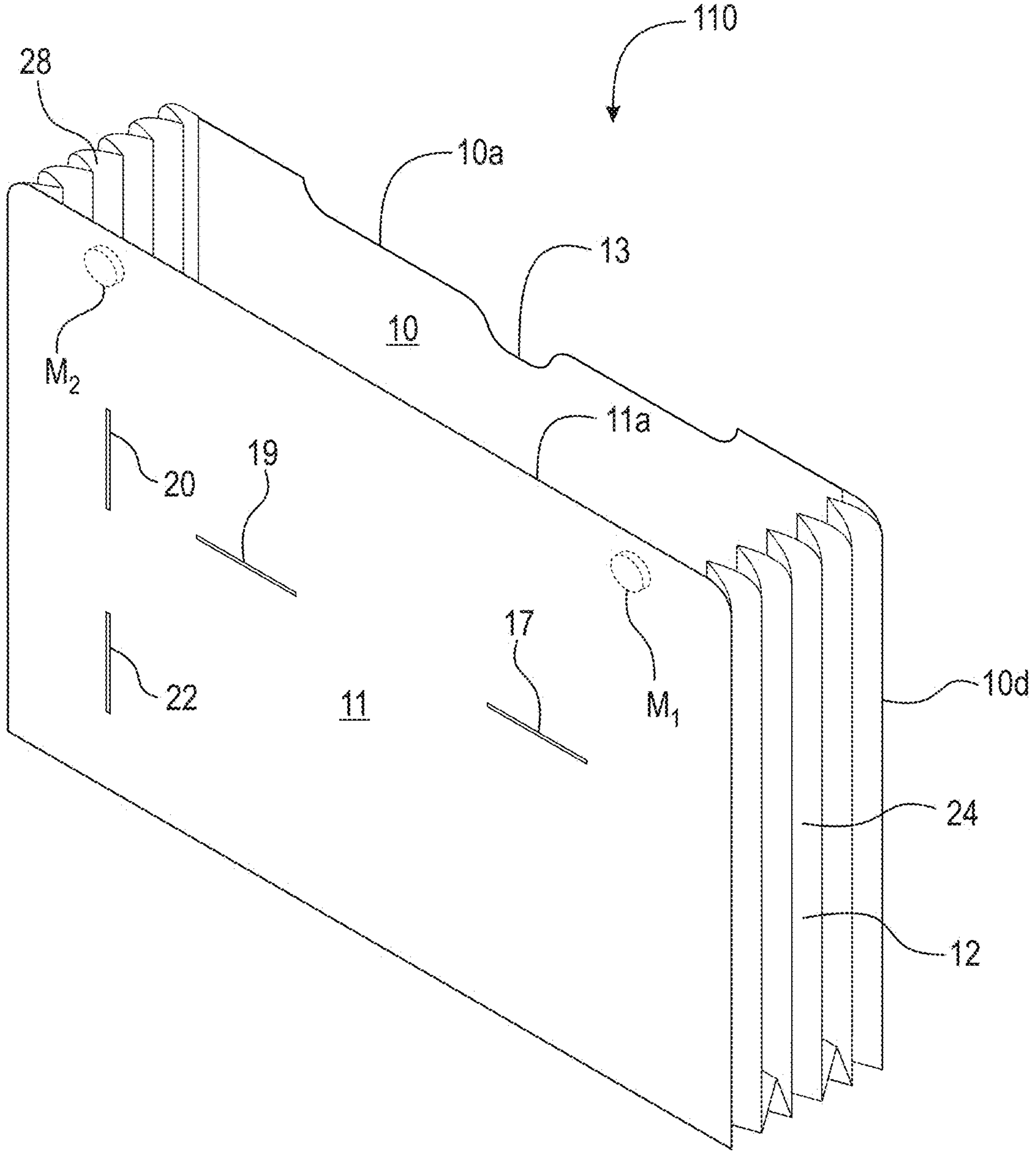
FIG. 7 illustrates a rear perspective view of the present invention shown in FIG. 3.

FIG. 7 illustrates a rear perspective view of expansion file folder 110 shown in FIG. 3. In the exemplary embodiment in FIG. 7, first wall 10 and second wall 11 are parallel and spaced apart from one another, forming a pocket in which the bottom of the pocket comprises bottom horizontal pleats 26 (shown in FIG. 5) of U-shaped pleated gusset 12, and the sides of the pocket comprise left vertical pleats 24 and right vertical pleats 28 of U-shaped pleated gusset 12.

Figure 8A:
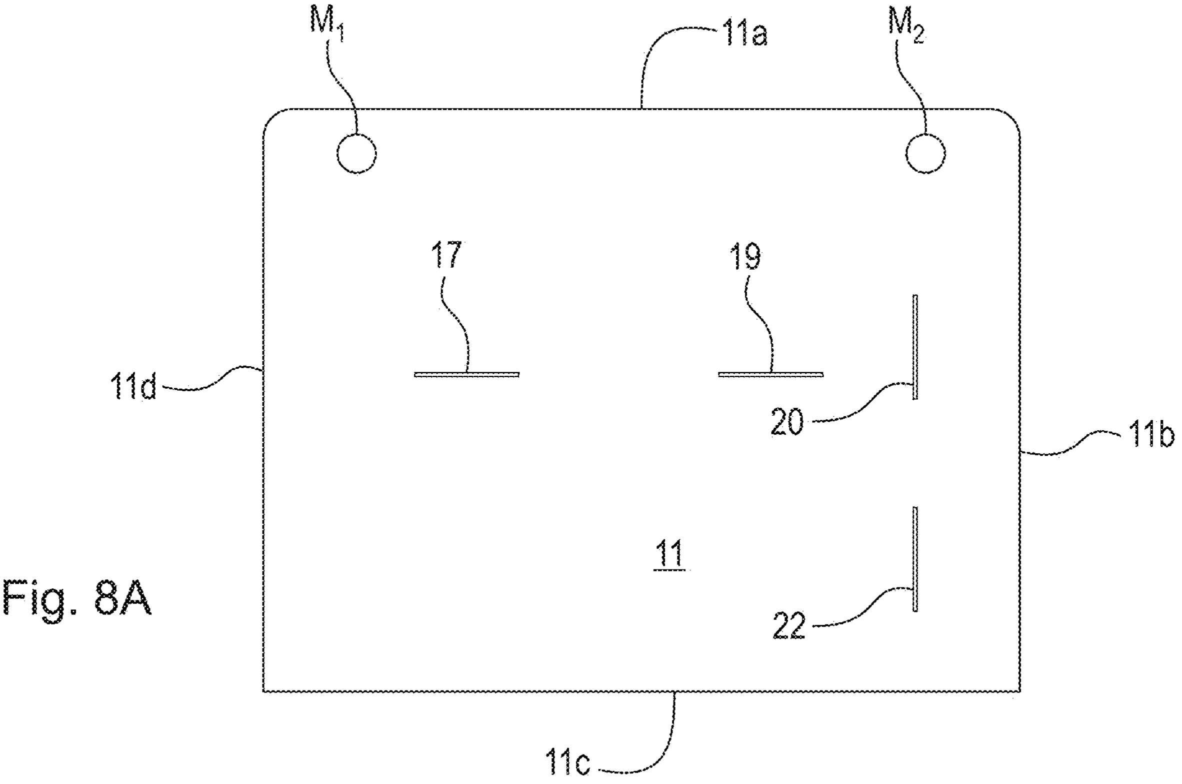
FIG. 8A illustrates an orthogonal view of the inside of the second wall.
Figure 8B:
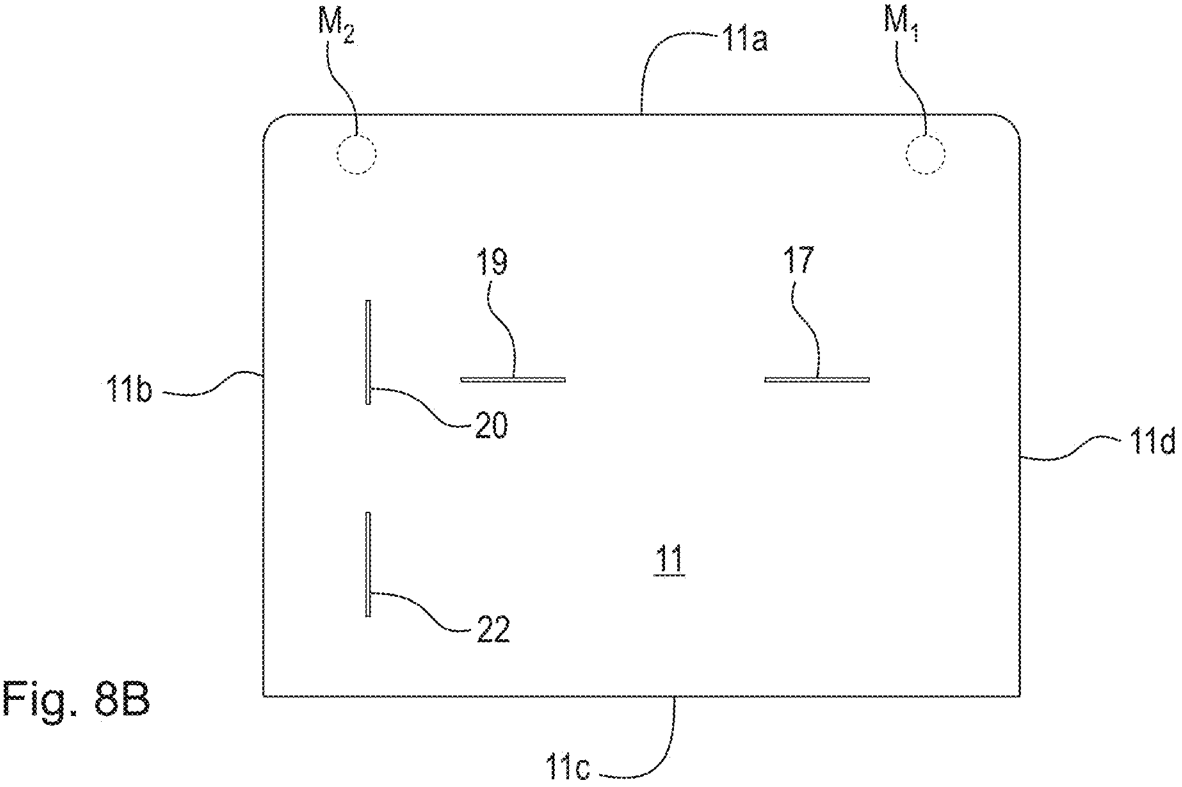
FIG. 8B illustrates an orthogonal view of the outside of the second wall.

FIGS. 8A and 8B illustrate an orthogonal view of the inside and outside of second wall 11, respectively. Second wall 11 has a first, second, third, and fourth side 11*a*, 11*b*, 11*c*, and 11*d*, respectively, horizontal slots 17, 19, vertical slots 20, 22, and magnets $M_1$, $M_2$ arranged on or embedded in the inside of second wall 11.

Figure 9:
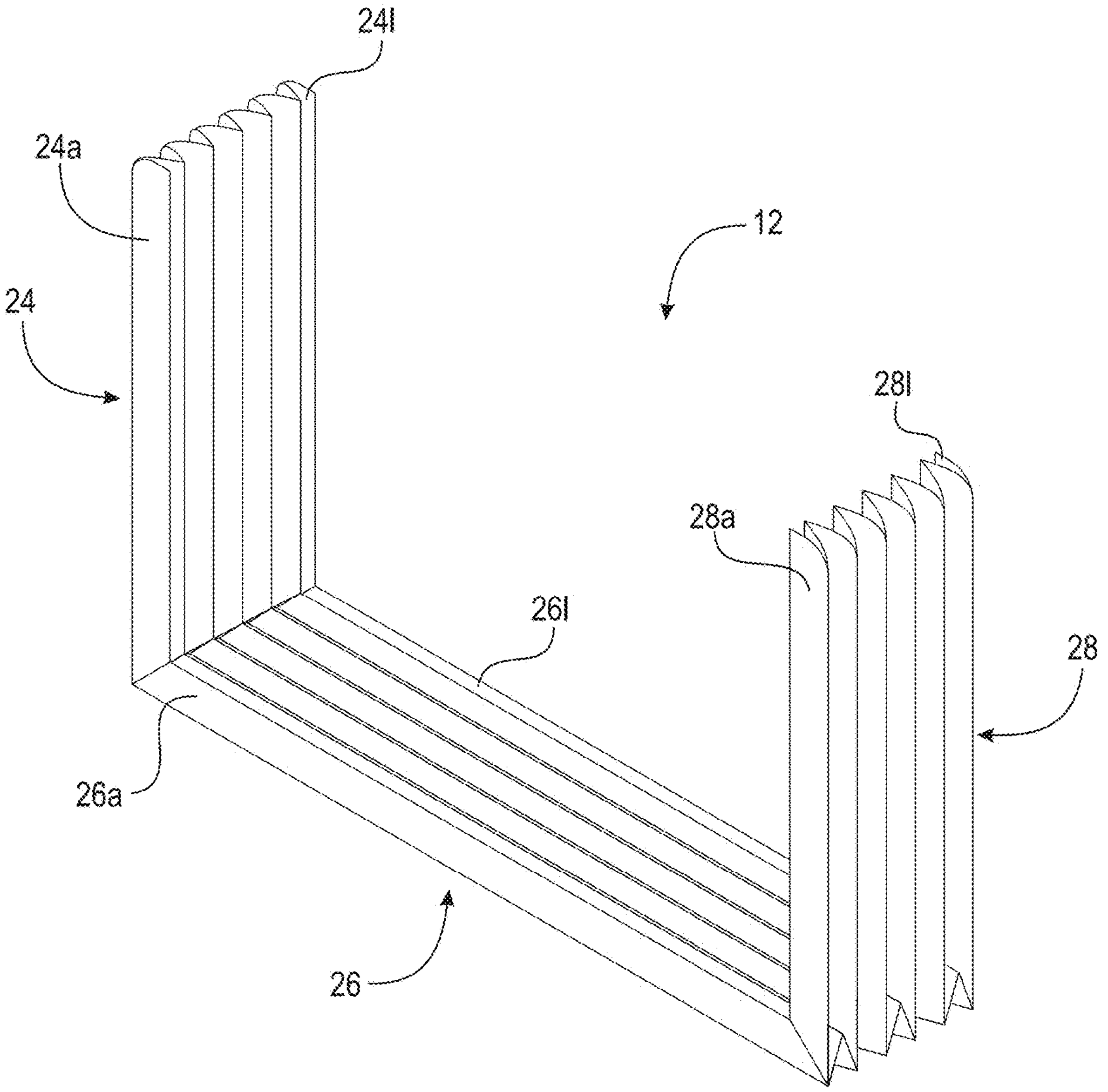
FIG. 9 illustrates a front-right perspective view of U-shaped pleated gusset 12.
Figure 10:
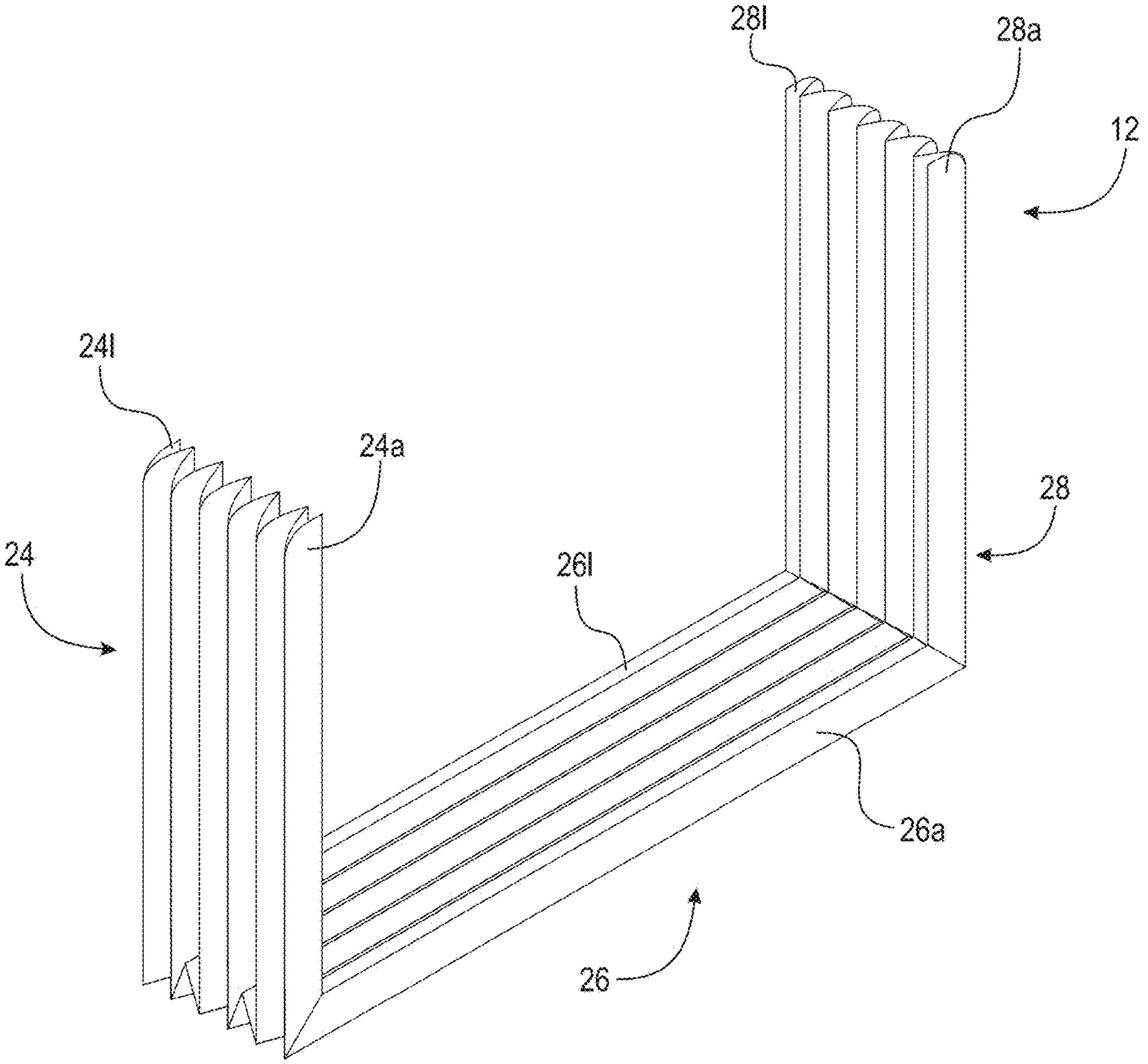
FIG. 10 illustrates a front-left perspective view of the U-shaped pleated gusset 12.

FIGS. 9 and 10 illustrate a front-right perspective view and a front-left perspective view of U-shaped pleated gusset 12, respectively. U-shaped pleated gusset 12 comprises left vertical pleats 24, bottom horizontal pleats 26, and right vertical pleats 28. In a preferred embodiment, U-shaped pleated gusset 12 is folded to create pleats, discussed below.

Figure 11:
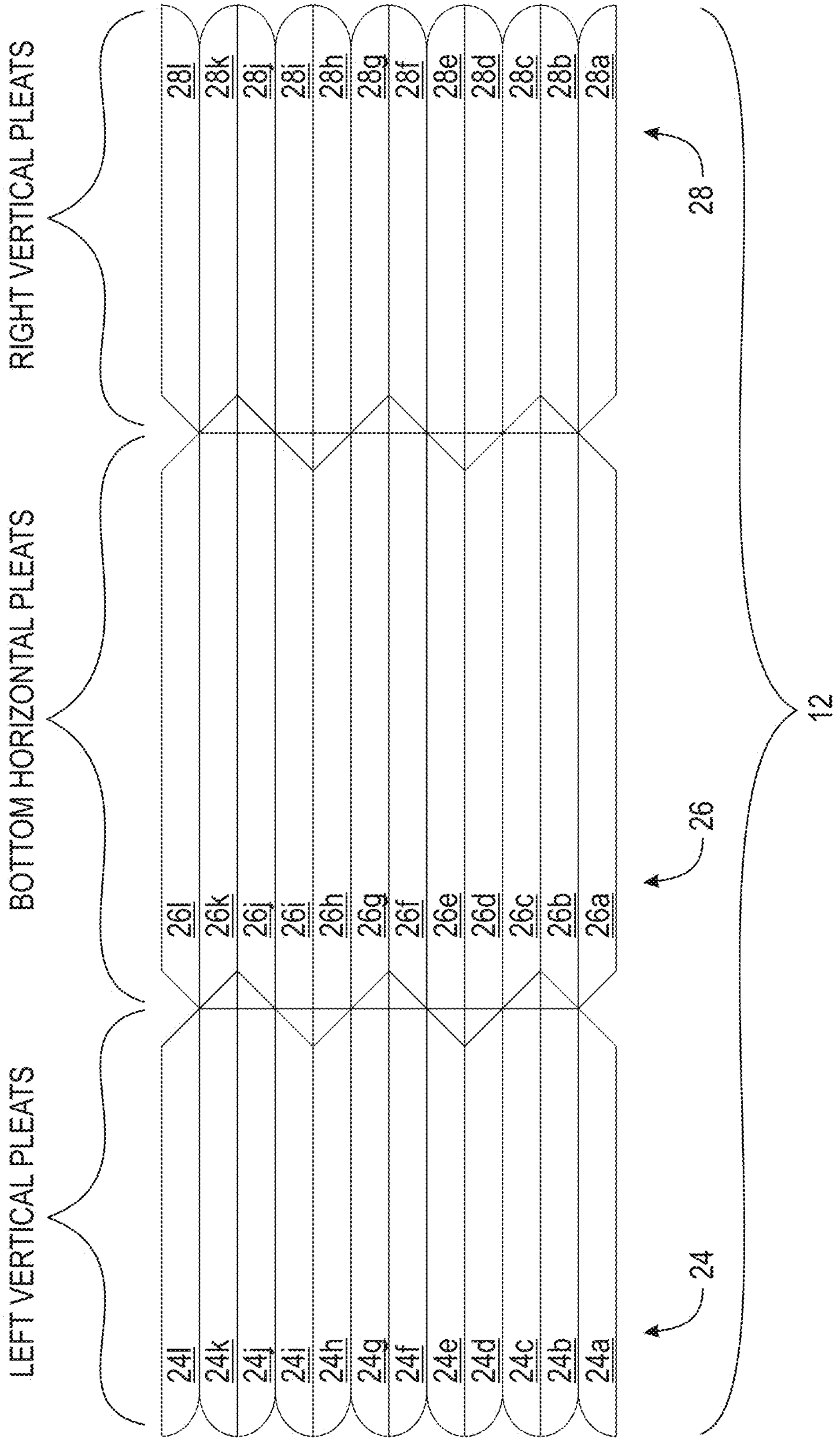
FIG. 11 illustrates a flattened view of the outside surface of the U-shaped pleated gusset shown in FIGS. 9 and 10.

FIG. 11 illustrates a flattened view of the outside surface of U-shaped pleated gusset 12 shown in FIGS. 9 and 10. U-shaped pleated gusset 12 comprises left vertical pleats 24, bottom horizontal pleats 26, and right vertical pleats 28. Left vertical pleats 24 comprises twelve (12) pleats 24*a-l*, which includes first left vertical pleat 24*a* and twelfth left vertical pleat 24*l*. Bottom horizontal pleats 26 comprises twelve (12) pleats 26*a-l*, which includes first bottom horizontal pleat 26*a* and twelfth bottom horizontal pleat 24*l*. Right vertical pleats 28 comprises twelve (12) pleats 28*a-l*, which includes first right vertical pleat 28*a* and twelfth right vertical pleat 28*l*.

Figure 12:
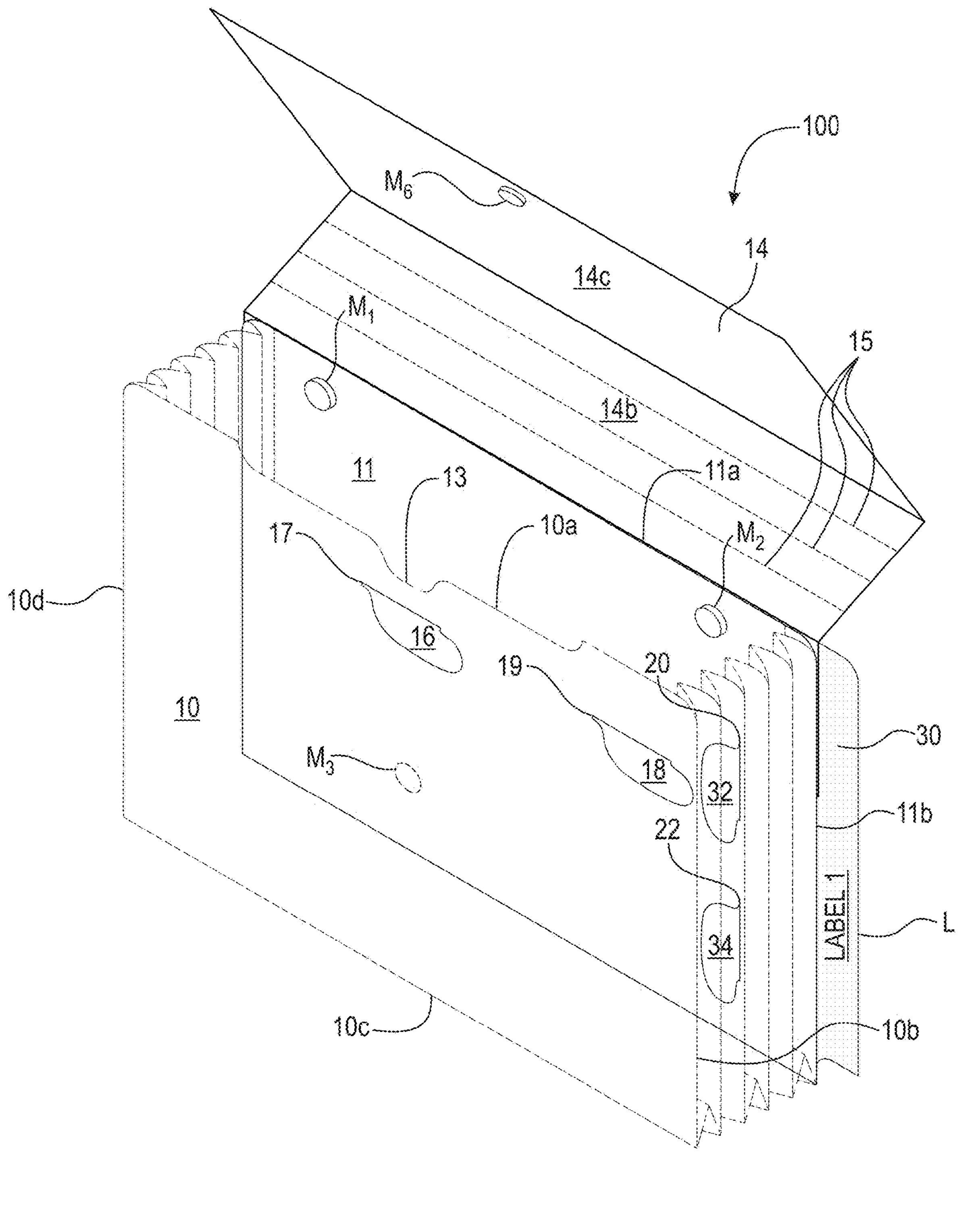
FIG. 12 illustrates a front perspective view of the present invention shown in FIG. 1 where the first wall and U-shaped pleated gusset are cut-away to specially highlight the horizontal slots and vertical slots interacting with the cover tabs, and the identification insert tabs; and, FIG. 13 illustrates a front perspective view of the cover and the identification insert being removably secured to the second wall by way of the horizontal and vertical slots.

FIG. 12 illustrates a front perspective view of expansion file folder 100 shown in FIG. 1 where first wall 10 and U-shaped pleated gusset 12 are cut-away to reveal horizontal slots 17, 19 and vertical slots 20, 22 arranged within second wall 11, interacting with cover tabs 16, 18 extending from cover 14 and identification insert tabs 32, 34 extending from identification insert 30. First cover tab 16 is arranged to removably engage first horizontal slot 17. Second cover tab 18 is arranged to removably engage second horizontal slot 19. First identification insert tab 32 is arranged to removably engage first vertical slot 20. Second identification insert tab 34 is arranged to removably engage second vertical slot 22.

Figure 13:
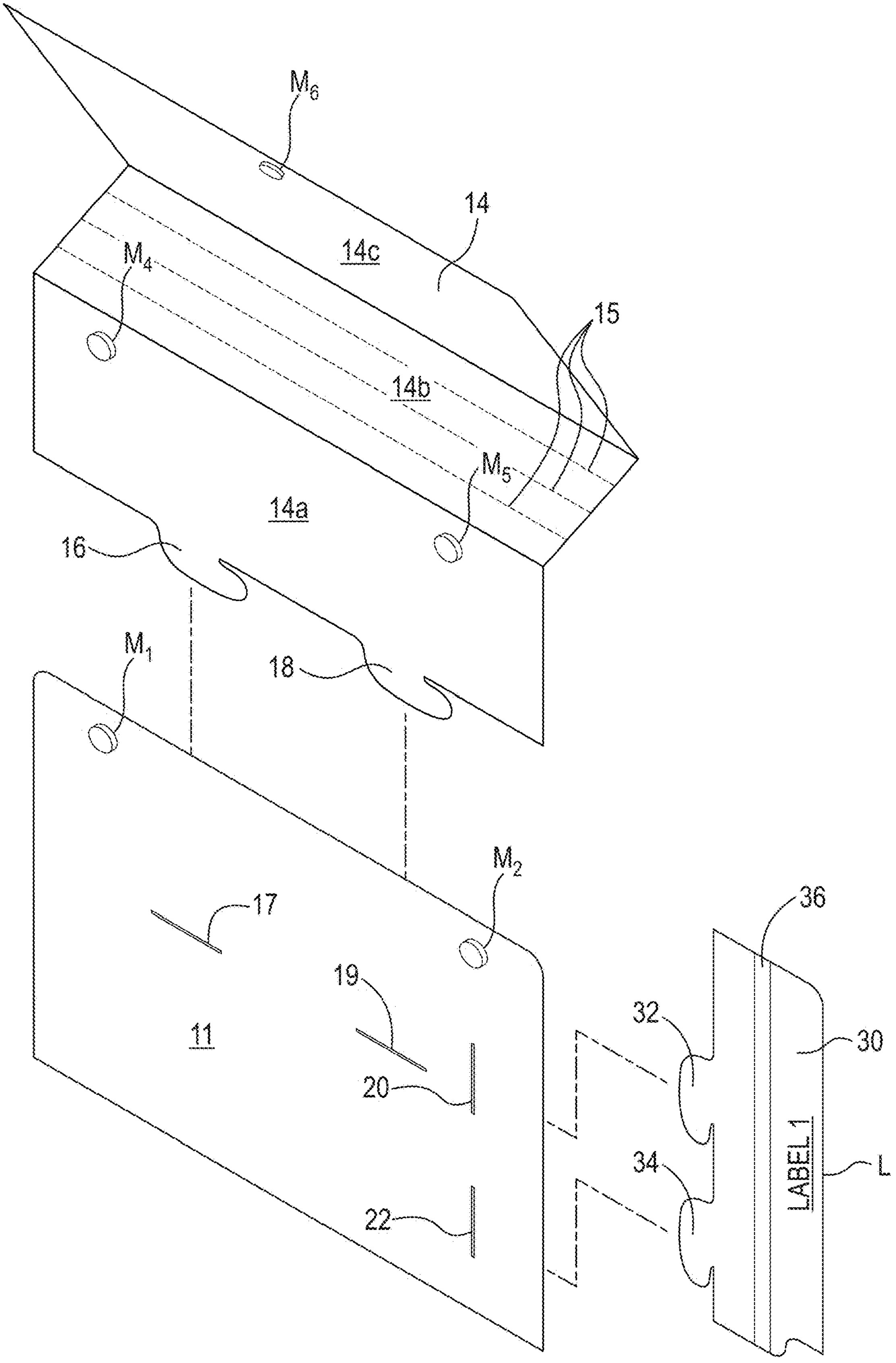

FIG. 13 illustrates a front perspective view of cover 14 and identification insert 30 being removably secured to second wall 11 by way of horizontal slots 17, 19 and vertical slots 20, 22. Cover 14 has back section 14*a*, middle section 14*b*, and front section 14*c*. Back section of cover 14*a* has a first cover tab 16 and second cover tab 18 arranged to removably engage the pair of horizontal slots 17, 19 in second wall 11. In the exemplary embodiment in FIG. 13, back section 14*a* of cover 14 also has two (2) magnets $M_4$, $M_5$ therein or thereon. Magnet $M_4$ is arranged to magnetically engage magnet $M_1$, and magnet $M_5$ is arranged to magnetically engage magnet $M_2$. Middle section 14*b* of cover 14 has a plurality of creases 15 which enable cover 14 to be closed with a variable amount of documents P within the pocket of expansion file folder 100. Front section 14*c* of cover 14 has magnet $M_6$ arranged to magnetically engage magnet $M_3$ (shown in FIG. 3). Identification insert 30 has a first identification insert tab 32 and a second identification insert tab 34 arranged to removably engage the pair of vertical slots 20, 22 in second wall 11. In a preferred embodiment, cover 14 and identification insert 30 are comprised of at least one of a plastic or polymer-like material, or a paperboard material. In another preferred embodiment, identification insert 30 has a vertical transverse strip of removable pressure sensitive adhesive 36.

Thus, it is seen that the objects of the invention are efficiently obtained, although modifications and changes to the invention may be readily imagined by those having ordinary skill in the art, and these changes and modifications are intended to be within the scope of the claims.

REFERENCE NUMBERS

10 First wall
10*a* First side of first wall
10*b* Second side of first wall
10*c* Third side of first wall
10*d*Fourth side of first wall
11 Second wall
11*a* First side of second wall
11*b* Second side of second wall
11*c* Third side of second wall
11*d* Fourth side of second wall
12 U-shaped pleated gusset
13 Access notch
14 Removably secured cover
14*a* Back section of removably secured cover
14*b* Middle section of removably secured cover
14*c* Front section of removably secured cover
15 Creases
16 Tab
17 First horizontal slot
18 Tab

19 Second horizontal slot
20 First vertical slot
22 Second vertical slot
24 Left vertical pleats
**24*a*** First left vertical pleat
**24*b*** Second left vertical pleat
**24*c*** Third left vertical pleat
**25*d*** Fourth left vertical pleat
**24*e*** Fifth left vertical pleat
**24*f*** Sixth left vertical pleat
**24*g*** Seventh left vertical pleat
**24*h*** Eighth left vertical pleat
**24*i*** Ninth left vertical pleat
**24*j*** Tenth left vertical pleat
**24*k*** Eleventh left vertical pleat
**24*l*** Twelfth left vertical pleat
26 Bottom horizontal pleats
**26*a*** First bottom horizontal pleat
**26*b*** Second bottom horizontal pleat
**26*c*** Third bottom horizontal pleat
**26*d*** Fourth bottom horizontal pleat
**26*e*** Fifth bottom horizontal pleat
**26*f*** Sixth bottom horizontal pleat
**26*g*** Seventh bottom horizontal pleat
**26*h*** Eighth bottom horizontal pleat
**26*i*** Ninth bottom horizontal pleat
**26*j*** Tenth bottom horizontal pleat
**26*k*** Eleventh bottom horizontal pleat
**26*l*** Twelfth bottom horizontal pleat
28 Right vertical pleats
**28*a*** First right vertical pleat
**28*b*** Second right vertical pleat
**28*c*** Third right vertical pleat
**28*d*** Fourth right vertical pleat
**28*e*** Fifth right vertical pleat
**28*f*** Sixth right vertical pleat
**28*g*** Seventh right vertical pleat
**28*h*** Eighth right vertical pleat
**28*i*** Ninth right vertical pleat
**28*j*** Tenth right vertical pleat
**28*k*** Eleventh right vertical pleat
**28*l*** Twelfth right vertical pleat
30 Removably secured identification insert
32 Tab
34 Tab
36 Removable pressure sensitive adhesive
100 Expansion file folder including cover 14 and identification insert 30
110 Expansion file folder without cover 14 and identification insert 30
L Printed Indicia
$M_1$ Magnet
$M_2$ Magnet
$M_3$ Magnet
$M_4$ Magnet
$M_5$ Magnet
$M_6$ Magnet
P Documents

What is claimed is:

1. An expansion file folder, comprising:
a first wall and a second wall, each having four sides, the second wall having a pair of horizontal slots and a pair of vertical slots therein;
a U-shaped pleated gusset, the gusset fixedly secured to three of the four sides of the first wall and fixedly secured to three of the four sides of the second wall, thereby forming an open pocket between the first and the second walls, the pocket having a pleated floor; and,
at least one of:
a cover having a pair of tabs extending therefrom, the pair of tabs of the cover arranged to removably engage the pair of horizontal slots; and,
an identification insert having a pair of tabs extending therefrom, the pair of tabs of the identification insert arranged to removably engage the pair of vertical slots.

2. The expansion file folder of claim 1, wherein the cover includes at least one magnet arranged therein and at least one of the first and the second walls having at least one of:
a magnet arranged thereon or therein; and,
a ferromagnetic piece thereon or therein, wherein the magnet of the cover is arranged to magnetically engage one of:
the magnets of at least one of the first and the second walls; and,
the ferromagnetic pieces of at least one of the first and the second walls.

3. The expansion file folder of claim 2, wherein the U-shaped pleated gusset is comprised of polypropylene.

4. The expansion file folder of claim 3, wherein the first and the second walls are comprised of at least one of:
a plastic or polymer-like material; and,
a paperboard material.

5. The expansion file folder of claim 4, wherein the cover and identification insert are comprised of at least one of:
a plastic or polymer-like material; and,
a paperboard material.

6. The expansion file folder of claim 5, wherein the identification insert incudes a vertical transverse strip of removable pressure sensitive adhesive.

7. An expansion file folder, comprising:
a first wall and a second wall, each having four sides, the second wall having a pair of horizontal slots and a pair of vertical slots therein;
a U-shaped pleated gusset, the gusset fixedly secured to three of the four sides of the first wall and fixedly secured to three of the four sides of the second wall, thereby forming an open pocket between the first and the second walls, the pocket having a pleated floor; and,
at least one of:
a cover having a pair of tabs extending therefrom, the pair of tabs of the cover arranged to removably engage the pair of horizontal slots, wherein the cover includes at least one magnet arranged therein and at least one of the first and the second walls having at least one of:
a magnet arranged thereon or therein; and,
a ferromagnetic piece thereon or therein, wherein the magnet of the cover is arranged to magnetically engage one of:
the magnets of at least one of the first and the second walls; and,
the ferromagnetic pieces of at least one of the first and the second walls; and,
an identification insert having a pair of tabs extending therefrom, the pair of tabs of the identification insert arranged to removably engage the pair of vertical slots.

8. The expansion file folder of claim 7, wherein the U-shaped pleated gusset is comprised of polypropylene.

9. The expansion file folder of claim 8, wherein the first and the second walls are each comprised of at least one of:
a plastic or polymer-like material; and,
a paperboard material.

10. The expansion file folder of claim 9, wherein the cover and identification insert are comprised of at least one of:

a plastic or polymer-like material; and, a paperboard material.

11. The expansion file folder of claim 10, wherein the identification insert includes a vertical transverse strip of removable pressure sensitive adhesive.

* * * * *